(12) United States Patent
Lee et al.

(10) Patent No.: US 7,417,934 B2
(45) Date of Patent: Aug. 26, 2008

(54) OPTICAL PICKUP

(75) Inventors: Young-pyo Lee, Yongin-si (KR);
Cheol-sung Yeon, Suwon-si (KR);
Hee-dong Kim, Suwon-si (KR);
Hong-kyu Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 549 days.

(21) Appl. No.: 10/759,227

(22) Filed: Jan. 20, 2004

(65) Prior Publication Data

US 2005/0007905 A1     Jan. 13, 2005

(30) Foreign Application Priority Data

Jan. 24, 2003   (KR) ................. 10-2003-0004839

(51) Int. Cl.
*G11B 7/00* (2006.01)

(52) U.S. Cl. ............... 369/112.01; 369/47.5; 369/116

(58) Field of Classification Search .............. None
See application file for complete search history.

(56) References Cited

U.S. PATENT DOCUMENTS 5,161,040 A * 11/1992 Yokoyama et al. ............. 359/19
5,500,846 A * 3/1996 Ophey ........................ 369/116
5,600,621 A * 2/1997 Noda et al. ............... 369/53.26
5,696,749 A * 12/1997 Brazas et al. .......... 369/112.09
5,991,255 A * 11/1999 Takahashi .............. 369/112.23
6,072,607 A * 6/2000 Tajiri et al. ..................... 359/15
6,577,585 B2 * 6/2003 Aoyama et al. ............. 369/255
2002/0009112 A1    1/2002 Nakata

FOREIGN PATENT DOCUMENTS

| JP | 4-155627 | | 5/1992 |
| JP | 04332185 A | * | 11/1992 |
| JP | 2001-052368 | * | 2/2001 |
| JP | 2001143305 A | * | 5/2001 |
| JP | 2001-332799 | | 11/2001 |

OTHER PUBLICATIONS

Korean Office Action for application 2003-4839, 2 pp and English language notice to submit response for same.

* cited by examiner

*Primary Examiner*—Joseph Feild
*Assistant Examiner*—Tawfik Goma
(74) *Attorney, Agent, or Firm*—Staas & Halsey LLP

(57) ABSTRACT

An optical pickup used to record information on and/or reproduce information from an optical recording medium, the optical pickup including an optical module to emit a light beam; and a front photo-detector to monitor power of the light beam; wherein the optical module is coupled to the front photo-detector so that a fixed distance is maintained between the optical module and the front photo-detector.

8 Claims, 5 Drawing Sheets

OPTICAL PICKUP

CROSS-REFERENCE TO RELATED APPLICATIONS

This application claims the priority of Korean Patent Application No. 2003-4839, filed on Jan. 24, 2003, in the Korean Intellectual Property Office, the disclosure of which is incorporated herein in its entirety by reference.

BACKGROUND OF THE INVENTION

1. Field of the Invention

The present invention relates to an optical pickup, and, more particularly, to an optical pickup including a front photo-detector to detect power of light incident on an objective lens.

2. Description of the Related Art

FIG. 1 schematically shows the structure of an optical pickup used in an optical disc drive. Referring to FIG. 1, the optical pickup includes a light source 1, a grating 2, a collimating lens 3, an objective lens 9, and a main photo-detector 7. The light source 1 emits a light beam having a predetermined wavelength. The grating 2 diverges $0^{th}$-order and $\pm 1^{st}$-order beams from the light beam. The collimating lens 3 transforms the divergent beams emitted from the light source 1 into parallel beams. The objective lens 9 enables the light beam to be focused as a light spot on a recording surface of an optical disc 10. The main photo-detector 7 receives a light beam reflected from the recoding surface of the optical disc 10 to detect an information signal and/or an error signal.

Reference numeral 4 denotes a beam splitter that enables the light beam emitted from the light source 1 to be incident on the objective lens 9, and that guides the light beam, which has been reflected from the optical disc 10 and passed through the objective lens 9, toward the main photo-detector 7. A concave lens 6 may be interposed between the beam splitter 4 and the main photo-detector 7 to prevent astigmatism.

A light beam having a predetermined power level should be incident on the optical disc 10 so as to record information and/or reproduce information from the optical disc 10. As shown in FIG. 1, the optical pickup further includes a beam splitter 5 and a front photo-detector (FPD) 8. The beam splitter 5 splits the light beam, which has passed through the beam splitter 4, into two beams so as to be incident on the objective lens 9 and the FPD 8, respectively. The FPD 8 detects power from the incident beam portion. When the detected light power is lower or higher than a predetermined level, the power of the light source 1 is adjusted so that a light beam having a predetermined power level is incident on the optical disc 10.

As described above, optical elements of an optical system are installed on a pickup base which moves in a radial direction of an optical disc. When an optical pickup is manufactured, it is necessary to adjust locations of the optical elements and angles among them when installing the optical elements. In other words, the installation locations and angles for the optical elements must be precisely adjusted to focus the light beam emitted from the light source 1 as a light spot of a predetermined size on a predetermined portion of the optical disc 10.

The FPD 8 should always be located relative to the light source 1 to precisely adjust the light power of the light source 1 to a predetermined level, so that the light power detected by the FPD 8 is proportional to the light power of the light source 1. However, as described above, when the locations of the light source 1 and the FPD 8 are separately adjusted, the locations of light source 1 and the FPD 8 may vary when an optical pickup is manufactured. In this case, the relationship between the light power of the light source 1 and the light power detected by the FPD 8 may vary when an optical pickup is manufactured. Thus, it is quite difficult to adjust the light power of the light source 1 to a predetermined level. Accordingly, whenever the location and angle of the light source 1 are adjusted, the location and angel of the FPD 8 must be adjusted. As a result, the cost of manufacturing an optical pickup may increase.

SUMMARY OF THE INVENTION

The present invention provides an improved optical pickup in which a front photo-detector and a light source are incorporated into an assembly so that the front photo-detector is always located relative to the light source.

Additional aspects and/or advantages of the invention will be set forth in part in the description which follows and, in part, will be obvious from the description, or may be learned by practice of the invention.

According to an aspect of the present invention, there is provided an optical pickup mounted on a pickup base moving relative to an optical recording medium and used to record information on and/or reproduce information from the optical recording medium. The optical pickup includes a first optical module, an objective lens to focus a first light beam emitted from the first optical module on the optical recording medium, and a first front photo-detector to monitor power of the first light beam emitted from the first optical module; wherein the first optical module is coupled to the front photo-detector to be installed on the pickup base.

The optical pickup may further include a first collimating lens between the first optical module and the objective lens to transform the first light beam into a parallel beam; wherein the first front photo-detector is provided between the first optical module and the first collimating lens.

The first optical module may comprise a light source to emit the first light beam; and a main photo-detector to receive the first light beam after being reflected from the optical recording medium to detect an information signal and/or an error signal.

The optical module may include a second optical module to emit a second light beam, wherein the first and second light beams have different wavelengths. One of the first and second light beams may have a first wavelength so as to record information on and/or reproduce information from a digital versatile disc, and the other one of the first and second light beams has a second wavelength so as to record information on and/or reproduce information from a compact disc.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
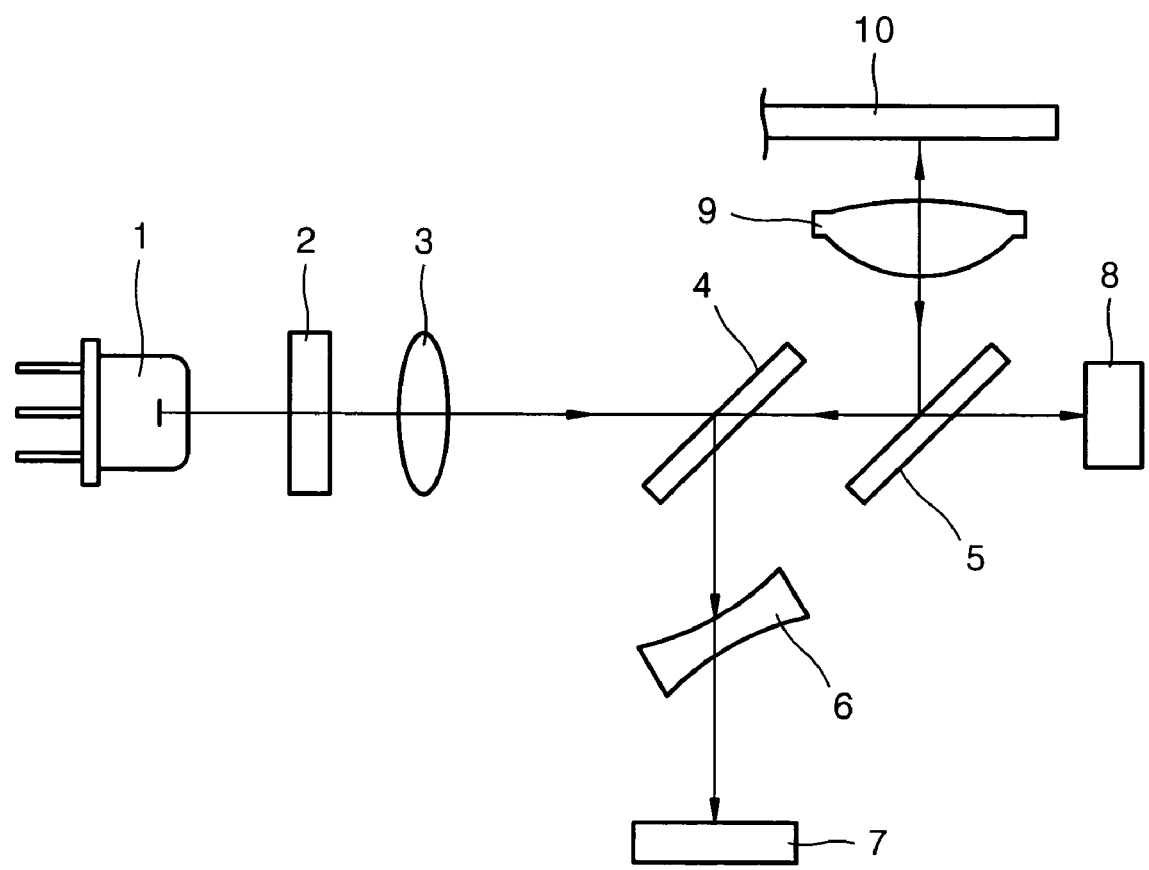
FIG. 1 is a schematic view showing the structure of a conventional optical pickup used in an optical disc drive.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
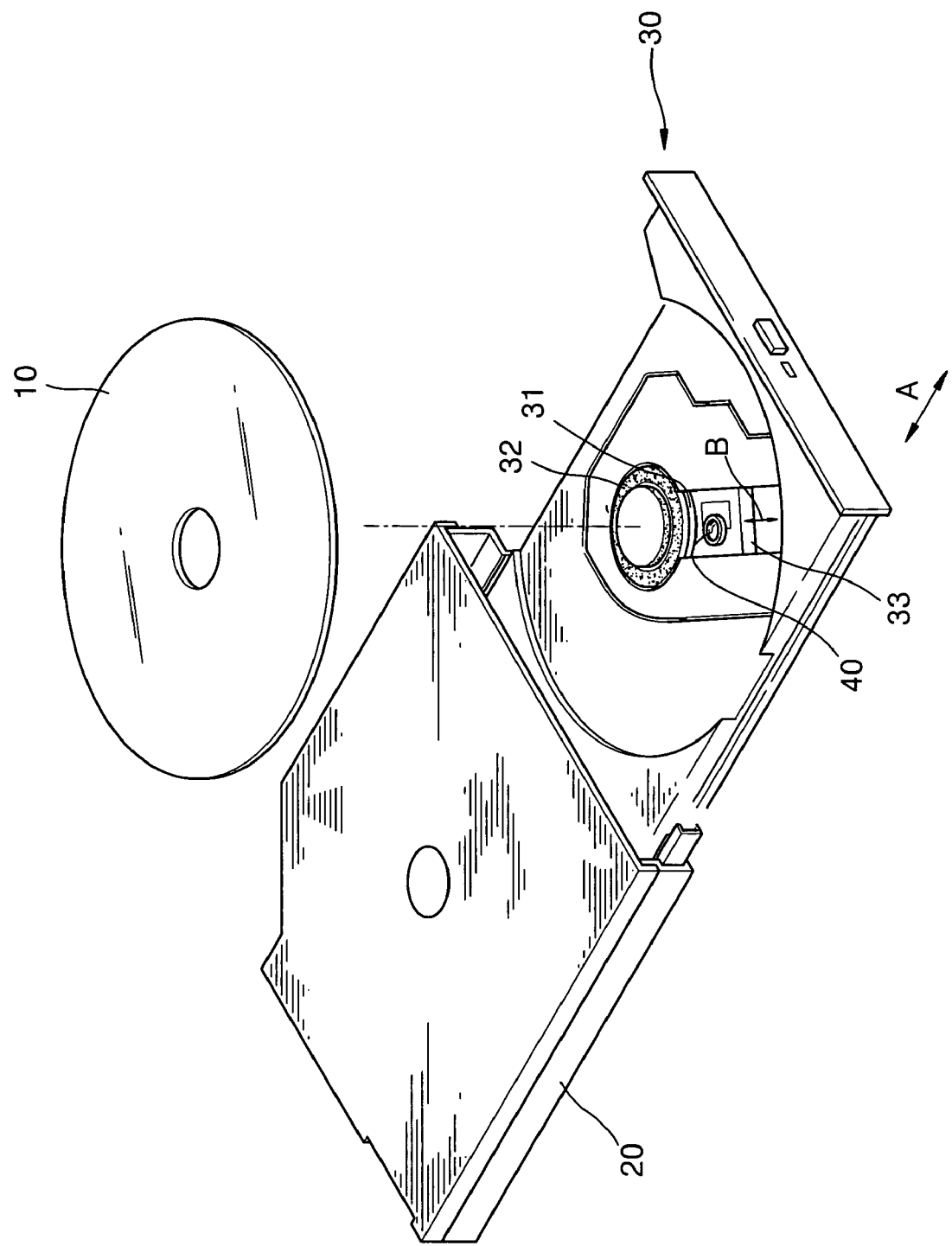
FIG. 2 is a perspective view of an optical disc drive adopting an optical pickup according to an embodiment of the present invention.

FIG. 2 is a perspective view of an optical disc drive adopting an optical pickup according to an embodiment of the present invention. Referring to FIG. 2, a tray 30 is installed in a housing 20 so as to slide in a direction indicated by arrow A. A spindle motor 31 and a pickup base 33 are installed in the tray 30. The spindle motor 31 rotates an optical disc 10, and has a shaft at which a turntable 32 is installed. The optical disc 10 is placed on the turntable 32. The pickup base 33 slides in a radial direction of the optical disc 10 as indicated by arrow B. An optical pickup 40 is installed on the pickup base 33. The optical pickup 40 accesses a recording surface of the optical disc 10 to record information and/or reproduce information from the optical disc 10.

Figure 3:
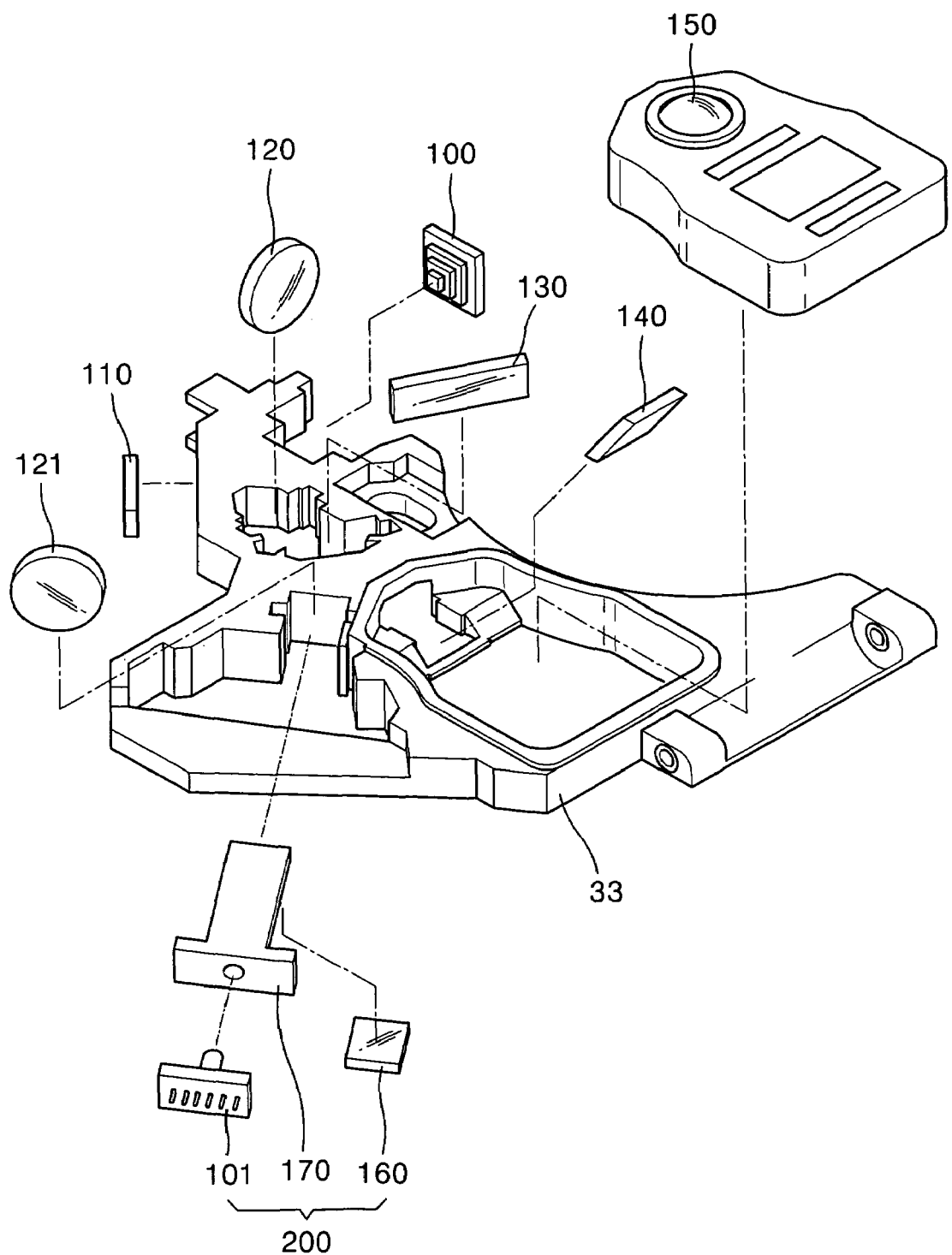
FIG. 3 is an exploded perspective view of the optical pickup of FIG. 2.
Figure 4:
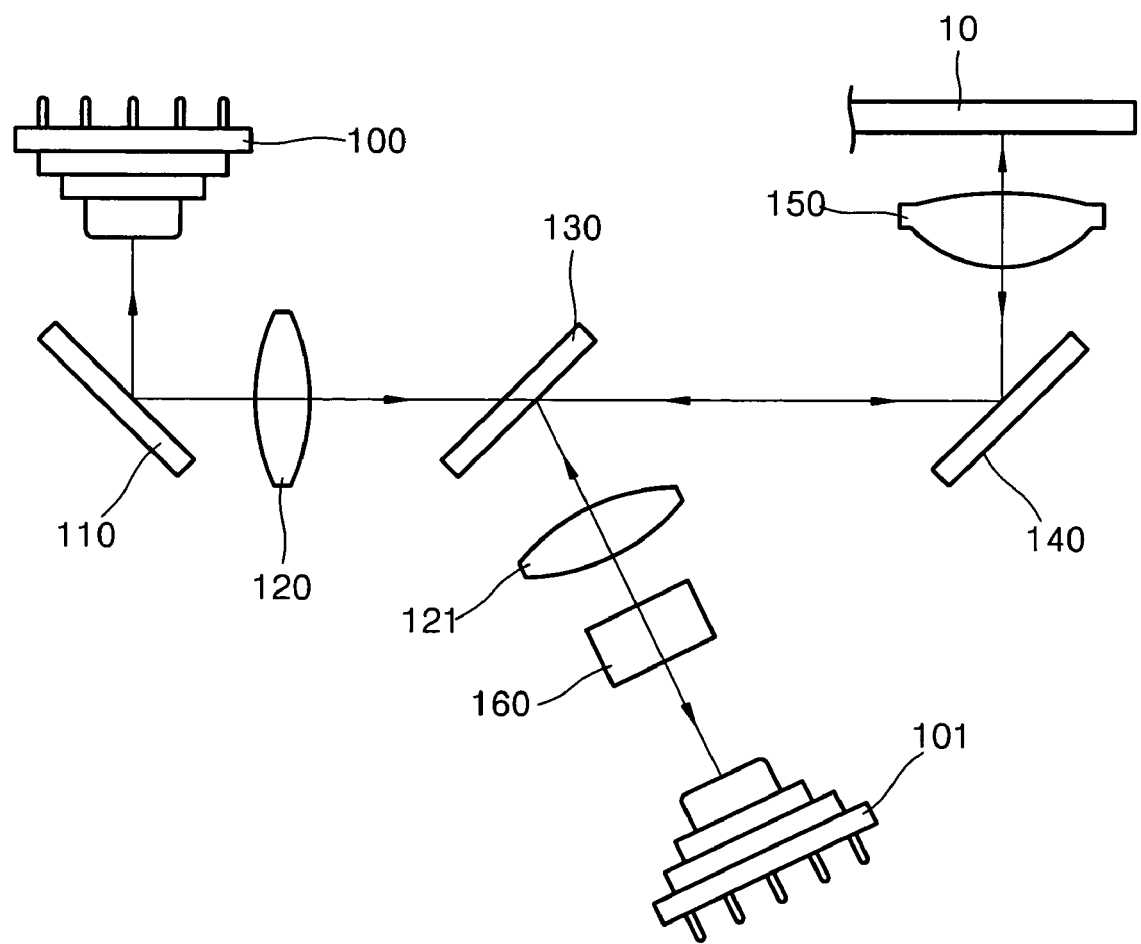
FIG. 4 is a schematic view of an optical system of the optical pickup of FIG. 3.

FIG. 3 is an exploded perspective view of the optical pickup of FIG. 2, and FIG. 4 is a schematic view of an optical system of the optical pickup of FIG. 3. Here, the optical pickup is constituted so as to perform recording on and/or reproduction from optical discs such as compact discs (CDs) and digital versatile discs (DVDs).

Referring to FIG. 4, the optical pickup includes optical modules 100 and 101, collimating lenses 120 and 121, a reflecting mirror 140, and an objective lens 150. The optical disc 10 is used as an optical recording medium.

Although not shown in FIG. 4, in each of the optical modules 100 and 101, a light source and a main photo-detector are incorporated into an assembly. Here, the light source emits a light beam having a predetermined wavelength, and the main photo-detector receives a light beam reflected from the optical disc 10 to detect an information signal and/or an error signal.

When three beams are to be used to detect a tracking error, the optical modules 100 and 101 may serve to diverge $0^{th}$-order and $\pm 1^{st}$-order beams from a light beam.

However, in a case where an optical module which only emits a light beam is used, instead of the optical modules 100 and 101, the main photo-detector 7 and the beam splitter 4 as shown in FIG. 1 may be further installed. When the three beams are used to detect the tracking error, the grating 2 as shown in FIG. 1 may be further installed.

In this embodiment, the optical module 100 emits a light beam having a red wavelength, i.e., a wavelength of 650 nm, so as to record information and/or reproduce information from a DVD. The optical module 101 emits a light beam having an infrared wavelength, i.e., a wavelength of 780 nm, so as to record information and/or reproduce information from a CD. In this case, the optical pickup of the present invention can be used to record information and/or reproduce information from CD-family optical discs and DVD-family optical discs.

The collimating lenses 120 and 121 transform divergent beams emitted from the optical modules 100 and 101 into parallel beams. For the transformation purpose, the optical modules 100 and 101 must be located at focuses of the collimating lenses 120 and 121, respectively.

The objective lens 150 focuses the light beam as a light spot of a predetermined size on the optical disc 10. An objective lens driver (not shown) is further installed to precisely adjust the location of the objective lens 150 so that the light beam is accurately incident on a predetermined portion of the optical disc 10.

Reference numeral 110 denotes a reflecting mirror which reflects the light beam emitted from the optical module 100 toward the collimating lens 120. Reference numeral 130 denotes an optical path changer which transmits the light beam emitted from the optical module 100 and reflects the light beam emitted from the optical module 101.

Reference numeral 160 denotes an FPD which detects power of the light beam emitted from the optical module 101. A light beam having a predetermined power level should be incident on the optical disc 10 so as to record information and/or reproduce information from the optical disc 10. When the light power detected by the FPD 160 is lower or higher than a predetermined level, the light power of the optical module 101 is adjusted so that a light beam having a predetermined power level is incident on the optical disc 10.

The FPD 160 may serve to detect light power from the parallel beam which passes through the collimating lens 121. In the conventional optical pickup, as shown in FIG. 1, the beam splitter 5 is needed to diverge a portion from the parallel beam before the parallel beam is incident on the objective lens 9. Also, the FPD 8 is installed in the rear of the beam splitter 5. In this case, the beam splitter 5 must be coated so as to transmit a predetermined amount of light toward the FPD 8. Thus, it is difficult to coat the beam splitter 5. In addition, since the light source 1 is distant from the FPD 8, it is not easy to incorporate the light source 1 and the FPD 8 into an assembly.

However, in this embodiment of the present invention, the FPD 160 is installed between the optical module 101 and the collimating lens 121 so as to detect a portion of the divergent beam. Thus, the beam splitter 5 as shown in FIG. 1 is not necessary.

Referring to FIG. 3, the optical elements shown in FIG. 4 are installed on the optical base 33 which slides in a radial direction of the optical disc 10. The locations of the optical elements and the angles among them are precisely adjusted so that the light beams emitted from the optical modules 100 and 101 are exactly incident on the objective lens 150.

The optical module 101 is combined with one end of a holder 170. The FPD 160 is combined with the other end of the holder 170 at a predetermined distance from the optical module 101. The optical module 101 and the FPD 160 are incorporated into the holder 170 to constitute an assembly 200. The assembly 200 is installed on the pickup base 33. The location of the assembly 200 is adjusted so that the optical module 101 is located at the focus of the collimating lens 121. As previously described, in the conventional optical pickup, the location of the light source 1 is adjusted, and then the location of the FPD 8 is adjusted. However, in the optical pickup of the present invention, the entire assembly 200 is moved to adjust the locations of the optical module 101 and the FPD 160. Nevertheless, the relative locations of the optical module 101 and the FPD 160 do not vary. Thus, the optical system may be completely adjusted by performing an adjustment process only one time.

Figure 5:
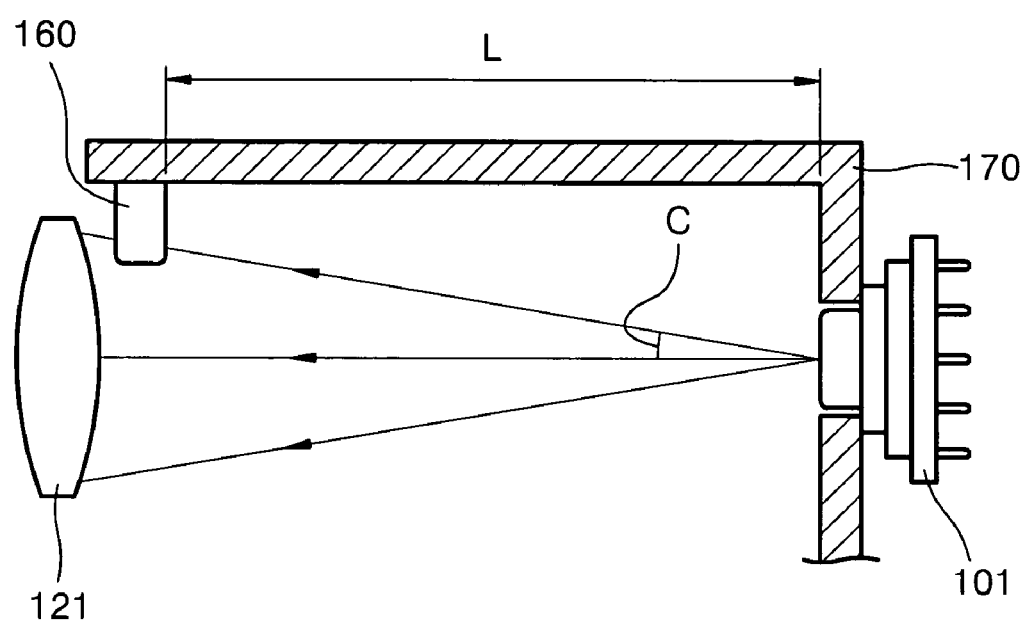
FIG. 5 is a view showing the relationship between an optical module and a front photo-detector.

As shown in FIG. 5, the FPD 160 detects the light power of the optical module 101 from a portion of the divergent beam emitted from the optical module 101. The divergent beam has a Gaussian distribution according to an angle with respect to an optical axis. Thus, the FPD 160 must always keep a predetermined distance L from the optical module 101, and a predetermined angle C with the optical axis, so that the light power of the optical module 101 can be accurately calculated from the light power detected by the FPD 160.

In the conventional optical pickup, the location of the light source 1 is adjusted, and then the location of the FPD 8 is adjusted to the location of the light source 1. Thus, the relative locations of the light source 1 and the FPD 8 may slightly vary according to a process of manufacturing an optical pickup. Therefore, it is difficult to accurately calculate the light power of the light source 1 from the light power detected by the FPD 8. In particular, it is quite difficult to detect light power from a divergent beam.

In the optical pickup according to the present invention, the relative locations of the optical module 101 and the FPD 160 are constant. Thus, the light power of the optical module 101 can be accurately calculated from the light power detected by the FPD 160. As a result, the light power of the optical module 101 can be precisely adjusted.

Light power of an optical module is particularly important when recording information on an optical recording medium. Thus, in the present invention, the case in which the optical module 101 is used to record information on a CD has been described. However, this does not limit the scope of the present invention to this embodiment. Although not shown, another FPD can be further included to detect the light power of the optical module 100. Even in this case, it is preferable that the optical module 100 is combined with the FPD.

Also, in the present invention, the case in which an FPD is installed between an optical module and a collimating lens has been described. However, the FPD and the optical module may be incorporated into an assembly wherein the FPD is installed to detect light power from a parallel beam that has passed through the collimating lens.

Also, an optical pickup according to the present invention can be used to record information on and/or reproduce information from a CD and a DVD. The optical pickup can also be used to record information on and/or reproduce information from other types of optical recording media.

In addition, since the optical module is combined with the FPD, the locations of the optical module and the FPD can be simply adjusted when manufacturing the optical pickup. As a result, productivity can be improved and costs can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup mounted on a pickup base moving relative to an optical recording medium and used to record information on and/or reproduce information from the optical recording medium, the optical pickup comprising:
   a first optical module, as a housing with a light source;
   an objective lens to focus a first light beam emitted from the first optical module on the optical recording medium;
   a first front photo-detector to monitor power of the first light beam emitted from the first optical module toward optical components to irradiate the optical recording medium;
   a first collimating lens between the first optical module and the objective lens to transform the first light beam into a parallel beam; and
   a holder adjustably installed on the pickup base, wherein the first optical module and the first front photo-detector are coupled to the holder such that the first front photo-detector is arranged a predetermined distance from the first optical module during an adjusting of the holder to locate the first optical module at the focus of the first collimating lens,
   wherein the first front photo-detector is provided between the first optical module and the first collimating lens.

2. The optical pickup of claim 1, wherein the first optical module comprises:
   the light source to emit the first light beam; and
   a main photo-detector to receive the first light beam after being reflected from the optical recording medium to detect an information signal and/or an error signal.

3. The optical pickup of claim 1 further comprising a second optical module to emit a second light beam, wherein the first and second light beams have different wavelengths.

4. The optical pickup of claim 3, wherein one of the first and second light beams has a first wavelength so as to record information on and/or reproduce information from a digital versatile disc, and the other one of the first and second light beams has a second wavelength so as to record information on and/or reproduce information from a compact disc.

5. The optical pickup of claim 4, wherein one of the first and second light beams has a wavelength of approximately 650 nm, and the other of the first and second light beams has a wavelength of approximately 780 nm.

6. The optical pickup of claim 3, further comprising:
   a second front photo-detector to monitor power of the second light beam; and
   a second collimating lens between the second optical module and the objective lens;
   wherein the first front photo-detector is provided between the first optical module and the first collimating lens, and the second front photo-detector is provided between the second optical module and the second collimating lens.

7. The optical pickup of claim 6, wherein the second optical module is coupled to the second front photo-detector to be installed on the pickup base.

8. An optical pickup mounted on a pickup base moving relative to an optical recording medium and used to record information on and/or reproduce information from the optical recording medium, the optical pickup comprising:
   an optical module, as a housing with a light source, to emit a light beam;
   a front photo-detector to monitor power of the light beam;
   a collimating lens to transform the light beam into a parallel beam; and
   a holder mounted on the pickup base;
   wherein the optical module and the front photo-detector are formed as a single unit, with the front photo-detector being between the optical module and the collimating lens to partially block light irradiated toward the collimating lens, and the single unit is arranged within the optical pickup so that the optical module is focused on the collimating lens, such that the front photo-detector is arranged a predetermined distance from the optical module.

* * * * *

UNITED STATES PATENT AND TRADEMARK OFFICE
CERTIFICATE OF CORRECTION

PATENT NO. : 7,417,934 B2 Page 1 of 1
APPLICATION NO. : 10/759227
DATED : August 26, 2008
INVENTOR(S) : Young-Pyo Lee et al.

It is certified that error appears in the above-identified patent and that said Letters Patent is hereby corrected as shown below:

Column 6, Line 19, change "claim 1" to --claim 1,--.

Signed and Sealed this

Eleventh Day of November, 2008

JON W. DUDAS
*Director of the United States Patent and Trademark Office*